United States Patent Office 2,922,306
Patented Jan. 26, 1960

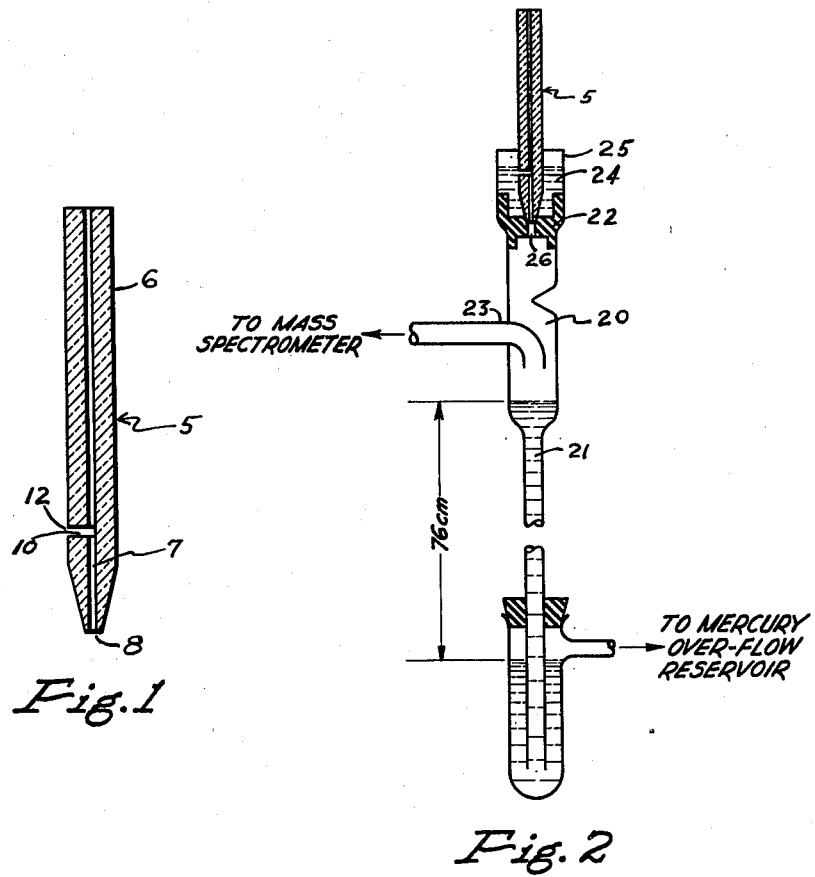

2,922,306

MICROPIPET

George F. Crable, Cheswick, Pa., assignor to Gulf Research & Development Company, Pittsburgh, Pa., a corporation of Delaware Application January 31, 1958, Serial No. 712,566

1 Claim. (Cl. 73—425.4)

This invention relates to a micropipet or means for measuring small quantities of liquid in combination with means for analyzing small liquid samples.

A number of analytical techniques employed by chemists require the collection or measurement of very small samples of liquids to be analyzed, for example, liquid samples of one microliter or less. Techniques requiring such small samples include mass spectrometric analysis, gas-liquid partition chromatography and molecular weight determinations by the Victor Meyer method. I have developed a simple, sturdy and inexpensive micropipet by means of which liquid samples of very small volume, e.g., less than one microliter, can be accurately measured or collected and introduced into a suitable analytical device. A liquid collecting or measuring means for such systems must be very accurate. It must be capable of collecting exactly the same amount of liquid each time it is used and introducing this same amount of liquid into the analyzing system for each analysis. The device must be sturdy because a fragile measuring means, however accurate, would have little value in most practical uses. I have now developed a micropipet or measuring device having these qualities and other desirable qualities including low cost, simplicity of use and ease of manufacture. Moreover, the novel device is particularly advantageous for use with analytical systems provided with inlet means having a liquid seal such as a liquid mercury seal, as will be explained more fully hereinafter.

In its simplest form the apparatus of my invention comprises an elongated tubular member having a handle portion at one end thereof, having at the other end, or liquid-collecting end thereof, a longitudinal capillary bore of diameter less than 0.25 mm., and having a lateral channel that communicates with said capillary bore and that communicates with a port in the wall of the tubular member spaced apart a short distance from the liquid-collecting end thereof.

The invention also extends to using the new device to introduce a measured liquid sample into an analytical system having a sample introduction section provided with a liquid seal. The method comprises inserting the liquid collecting end of the pipet into a body of the liquid to be analyzed whereby to cause the liquid to fill the capillary bore to the level of the lateral channel, then immersing the liquid-collecting end of the pipet in the liquid seal of the sample introduction section, the end of the device being immersed in the sealing liquid to a depth sufficient to submerge the port of the lateral channel in the wall of the pipet. The measured liquid sample is withdrawn from the liquid-collecting end of the pipet into the analytical means, and the sealing liquid is drawn through the lateral channel, then through the capillary bore and out the end of the pipet so as to sweep any remaining portion of the liquid sample into the analytical means.

My invention will be described in more detail by reference to the drawings of which:

Figure 1 is a sectional elevation of a preferred form of the micropipet of the invention; and Figure 2 is a diagrammatic view in elevation and partly in section of the micropipet in position for injecting a liquid sample into the mercury-sealed sample introduction section of a mass spectrometer.

As Figure 1 shows, the micropipet or measuring device of the invention comprises an elongated tubular member 5 having a handle portion 6 at one end thereof and a longitudinal capillary bore 7 which emerges from the other end or liquid-collecting end 8 thereof. Spaced apart a short distance from the liquid collecting end 8 is a lateral channel 10. This lateral channel extends from the capillary bore 7 to a port 12 in the outer wall of the pipet, the port being spaced a short distance from the liquid-collecting end 8. Preferably, as shown in the drawing, the liquid-collecting end is tapered to a reduced outside diameter.

The device of the invention can vary considerably in certain of its dimensions. However, the capillary bore 7 must be no greater than about 0.25 mm. in diameter, the reason for which I will explain hereinafter. One suitable form of the device is constructed from a length of glass capillary tubing about 10 centimeters in length and about 8 mm. in outside diameter. The capillary bore is about 0.20 mm. in diameter. The lateral channel 10 is perpendicular to the longitudinal capillary bore 7 and is about 2 centimeters from the liquid-collecting end 8 of the pipet.

The pipet can be of any material having the desired physical strength and resistance to chemical reaction with the liquid being measured. Glass is preferred but metals such as stainless steel, brass, etc., can also be used.

To collect a sample of liquid with the pipet the tapered liquid-collecting end is dipped into a body of the liquid to any desired level. By capillary attraction the liquid fills the capillary bore 7. The device is so constructed that it will always collect substantially exactly the same volume of liquid. If the lateral channel 10 is of considerably larger cross sectional area than the longitudinal capillary bore, the liquid will rise in the capillary bore to the level at which the lateral channel intercepts it. In a preferred embodiment of the device the lateral channel is formed by cutting with a glass saw through the wall of a glass capillary tube to the capillary bore or slightly beyond it. In this case the lateral channel formed by the saw cut is of larger cross sectional area than the longitudinal capillary bore and liquid will rise in the capillary bore only to the level of the cut. In another embodiment the lateral channel is a capillary channel formed in the wall of the tube. In this embodiment the liquid sample collected with the pipet fills the capillary bore and the lateral channel, which, in effect, is a lateral extension of the capillary bore. In this embodiment it is necessary to close any other capillary channels that communicate with the capillary bore 7 or with the lateral extension 10. Thus, for example, if the device is made from capillary tubing that has a bore extending from one end to the other it will be necessary to close off the capillary channel extending from the lateral channel 10 toward the handle end of the pipet. This can be done by heating the tube immediately above the lateral channel to fuse the glass and close the capillary channel extending beyond the lateral channel. The device can also be made by first closing the longitudinal bore of a tube at the desired distance from the end and then forming the lateral channel adjacent the point of closure.

The size of the lateral channel 10 is not critical. In the interest of physical strength, however, it should not be too large, although in a preferred embodiment, as mentioned, it is formed by a saw cut perpendicular to the axis of the tube and communicating with the longitudinal capillary bore. The lateral channel can be perpendicular to the longitudinal capillary bore as shown in the drawing or can be at any desired angle to it.

As I have said, if the lateral channel 10 is a relatively large channel such as a saw cut, the liquid will be collected only in the longitudinal capillary bore 7. However, if the lateral channel is itself a small capillary channel, the liquid will fill the longitudinal capillary bore 7 and the lateral channel or extension 10, and the capillary channel extending into the handle of the pipet will be closed. In either case, the device will always collect and discharge the same volume of liquid. The desired volume can be selected by properly positioning the lateral channel. For example, if the capillary bore has a diameter of 0.2 mm. and the lateral channel is formed by making a saw cut 20 mm. from the liquid-collecting end 8 of the pipet, the volume of the capillary bore 7 and of the sample collected will be about 0.6 microliter.

One valuable use for my device is for introducing a measured liquid sample into a mass spectrometer provided with a mercury-sealed liquid introduction section. Figure 2 illustrates this use. As shown diagrammatically, the liquid introduction section of the mass spectrometer comprises an evacuated vaporization chamber 20 which is sealed at its lower end by a barometric-type mercury column 21 and is covered at its upper end by a pierced rubber diaphragm 22 which is sealed by a pool of mercury 24 maintained in the cup 25. At about its midpoint the vaporization chamber 20 is provided with an exit conduit 23 for conducting the vaporized material to the reservoir and analyzer tube of the mass spectrometer.

It is essential in a device of this type that only the material to be analyzed be introduced into the system and it is usually essential that a predetermined, exact amount of such material be introduced. Since the vaporization chamber 20 is evacuated to cause vaporization of the liquid being analyzed, the liquid mercury seals are provided to prevent leakage of air or other foreign substances into the system and to prevent loss of the volatile sample during the sample introduction procedure.

The micropipet is filled by dipping its tapered, liquid-collecting end below the surface of a body of the liquid to be analyzed. The capillary bore is filled by capillary action. The liquid rises in the capillary bore to the cut or lateral channel 10. The filled pipet is then immersed in the pool of mercury 24 of the mass spectrometer inlet section and the tip of the pipet is pressed into the small hole 26 in the rubber diaphragm. The mercury pool 24 is deep enough to cover the port 12 of lateral channel 10. Pressing the tapered end of the pipet into the hole 26 causes the longitudinal capillary bore 7 to communicate with the evacuated chamber 20 whereupon the liquid is sucked out of bore 7 of the pipet and into the evacuated chamber where it is vaporized. Since the port 12 is below the mercury level, mercury is drawn into the lateral channel 10 and into the capillary bore 7 behind the liquid sample and provides a very efficient sweeping action. A small amount of mercury will pass through the capillary bore 7 and will sweep out all of the sample to be analyzed. This mercury will collect in the pool of mercury at the top of the barometric mercury column 21. The design of the barometric mercury column is not a part of the invention. It is used simply as a means for sealing the evacuated vaporization chamber and for collecting mercury that drops into the vaporization chamber from the overhead sealing pool 24.

The micropipet of my invention is particularly adapted for use in combination with the liquid-sealed sample introduction system as described above to accomplish the purpose of introducing all of a predetermined amount of a liquid sample without introducing air or other foreign substances. By immersing the pipet to a sufficient depth in the mercury pool to cover the port of the lateral channel the mercury will enter the lateral channel and the longitudinal capillary bore and remove all of the sample from the pipet without allowing air or other substances to enter the system. My new device is also particularly useful because it can be made sufficiently sturdy for any analytical use. It can be firmly injected into a rubber diaphragm as shown in Figure 2 without serious danger of breaking and spoiling the analysis.

I have mentioned that the capillary bore should be no greater in diameter than about 0.25 mm. If the diameter is greater, mercury will enter the capillary bore when the pipet containing the liquid sample to be analyzed is dipped into the mercury pool. The mercury will displace a small portion of the sample out of the capillary bore and into the lateral channel or cut where vaporization losses will occur if the lateral channel is of large cross sectional area.

I have described the use of my device in connection with a particular type of sample introduction means for a mass spectrometer. The device is also highly advantageous for introducing a small liquid sample into other analytical means, such as gas chromatography apparatus and apparatus for vapor density or molecular weight determination by the Victor Meyer method. The liquid introduction means of Figure 2 is provided with a rubber diaphragm pierced with a small hole at its center, but other devices can be used for supporting the sealing pool of mercury. One suitable device is a porous glass disc which is used instead of the rubber diaphragm. The micropipet is immersed in the mercury pool and its tapered end 8 is pressed against the porous glass disc. The liquid is withdrawn by the capillary action of the pores of the porous glass disc and the liquid vaporizes as it reaches the other face of the glass disc which is exposed to the evacuated vaporization chamber. In another modification a metal, plastic or glass plate or disc provided with a hole tapered to fit the tapered end of the micropipet is used instead of the rubber diaphragm. The small hole is provided with a removable plug which is removed when the micropipet is to be inserted.

I have described the use of mercury as a sealing liquid for the sample introduction section of an analyzing means. However, other sealing liquids can be used, including liquid metals such as gallium and indium.

Obviously many modifications and variations of the invention as hereinbefore set forth may be made without departing from the spirit and scope thereof and therefore only such limitations should be imposed as are indicated in the appended claim.

I claim:

The combination comprising an analytical means having a liquid sealed sample introduction section and a micropipet for introducing a liquid sample into said sample introduction section, said micropipet comprising an elongated tubular member having a longitudinal capillary bore at the liquid-collecting end thereof and a lateral channel connecting said capillary bore with a port in the wall of said tubular member spaced a short distance from the liquid-collecting end thereof, said sample introduction section of the analytical means being surmounted by a pierced inlet diaphragm and the latter being surmounted by a cup adapted to receive a pool of sealing liquid to cover said pierced diaphragm, said diaphragm being pierced with a small hole adapted to receive a liquid sample from the end of said micropipet and said cup being of sufficient depth to immerse said port of the wall of said pipet in the liquid in said cup when the liquid-collecting end of said micropipet is in contact with said hole in said diaphragm.

References Cited in the file of this patent
UNITED STATES PATENTS 2,667,075     Blum et al. _____ Jan. 26, 1954

OTHER REFERENCES

Quantitative Ultramicroanalysis, by Paul L. Kirk, pages 22 and 23, John Wiley and Sons Inc., New York.